United States Patent
Mörz et al.

(10) Patent No.: US 11,797,097 B2
(45) Date of Patent: Oct. 24, 2023

(54) METHOD FOR GENERATING HAPTIC FEEDBACK

(71) Applicant: MERCEDES-BENZ GROUP AG, Stuttgart (DE)

(72) Inventors: Sebastian Mörz, Sindelfingen (DE); Jörg Reisinger, Löchgau (DE); Jörg Stippa, Stuttgart (DE); Andreas Müller, Gäufelden (DE); Manuel Christopher Albert, Bondorf (DE); Fabian Schöller, Kernen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/016,974

(22) PCT Filed: Jun. 24, 2021

(86) PCT No.: PCT/EP2021/067412
§ 371 (c)(1),
(2) Date: Jan. 19, 2023

(87) PCT Pub. No.: WO2022/017722
PCT Pub. Date: Jan. 27, 2022

(65) Prior Publication Data
US 2023/0280829 A1   Sep. 7, 2023

(30) Foreign Application Priority Data

Jul. 20, 2020 (DE) ...................... 10 2020 004 363.1

(51) Int. Cl.
*G06F 17/00* (2019.01)
*G06F 3/01* (2006.01)
*G06F 3/0488* (2022.01)

(52) U.S. Cl.
CPC ............ *G06F 3/016* (2013.01); *G06F 3/0488* (2013.01); *G06F 2203/014* (2013.01); *G06F 2203/04806* (2013.01); *G06F 2203/04808* (2013.01)

(58) Field of Classification Search
CPC .. G06F 3/016; G06F 3/0488; G06F 2203/014; G06F 2203/04806; G06F 2203/04808
See application file for complete search history.

(56) References Cited

U.S. PATENT DOCUMENTS

2010/0156818 A1*   6/2010   Burrough ............ G06F 3/04883
                                                             345/173
2013/0215079 A1    8/2013   Johnson et al.
(Continued)

OTHER PUBLICATIONS

Gueorguiev, David, et al. "The tactile perception of transient changes in friction." Journal of The Royal Society Interface 14.137 (2017): 20170641 (Year: 2017).*
(Continued)

*Primary Examiner* — Andrew T McIntosh
(74) *Attorney, Agent, or Firm* — PATENT PORTFOLIO BUILDERS PLLC

(57) ABSTRACT

A method for generating a haptic feedback on a display area operable by finger movements involves sensing a position of a finger on the display area and modulating a coefficient of friction between the finger and the display area is modulated depending on the position. The touchdown positions of two fingers are determined and the friction between each of the fingers and the display area is changed depending on a distance from the touchdown positions of the fingers simultaneously touching the surface.

9 Claims, 4 Drawing Sheets

(56) References Cited

U.S. PATENT DOCUMENTS

Figure 1:
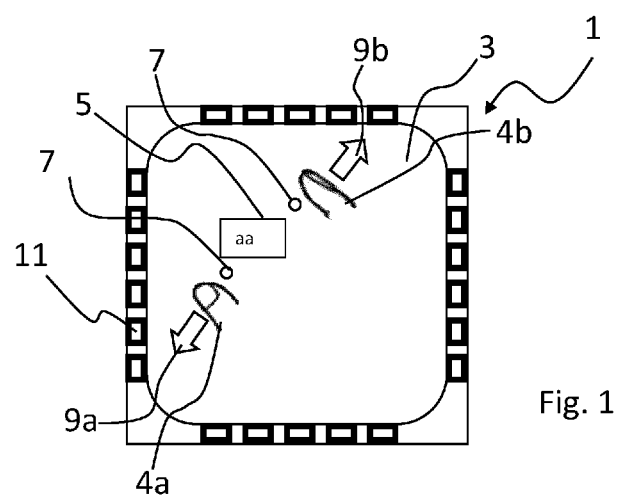

| | | | |
|---|---|---|---|
| 2014/0139450 A1 | 5/2014 | Levesque et al. | |
| 2014/0267065 A1 | 9/2014 | Levesque | |
| 2014/0327839 A1 | 11/2014 | Giraud et al. | |
| 2017/0292712 A1* | 10/2017 | Alexander | H03K 17/962 |
| 2019/0235627 A1 | 8/2019 | Klein et al. | |
| 2019/0354185 A1 | 11/2019 | Vezzoli et al. | |

OTHER PUBLICATIONS

Osgouei, Reza Haghighi, Jin Ryong Kim, and Seungmoon Choi. "Improving 3D Shape recognition withelectrostatic friction display." IEEE transactions on haptics 10.4 (2017): 533-544 (Year: 2017).*

International Search Report and Written Opinion dated Oct. 14, 2021 in related/corresponding International Application No. PCT/EP2021/067412.

Office Action dated Apr. 15, 2021 in related/corresponding DE Application No. 10 2020 004 363.1.

* cited by examiner

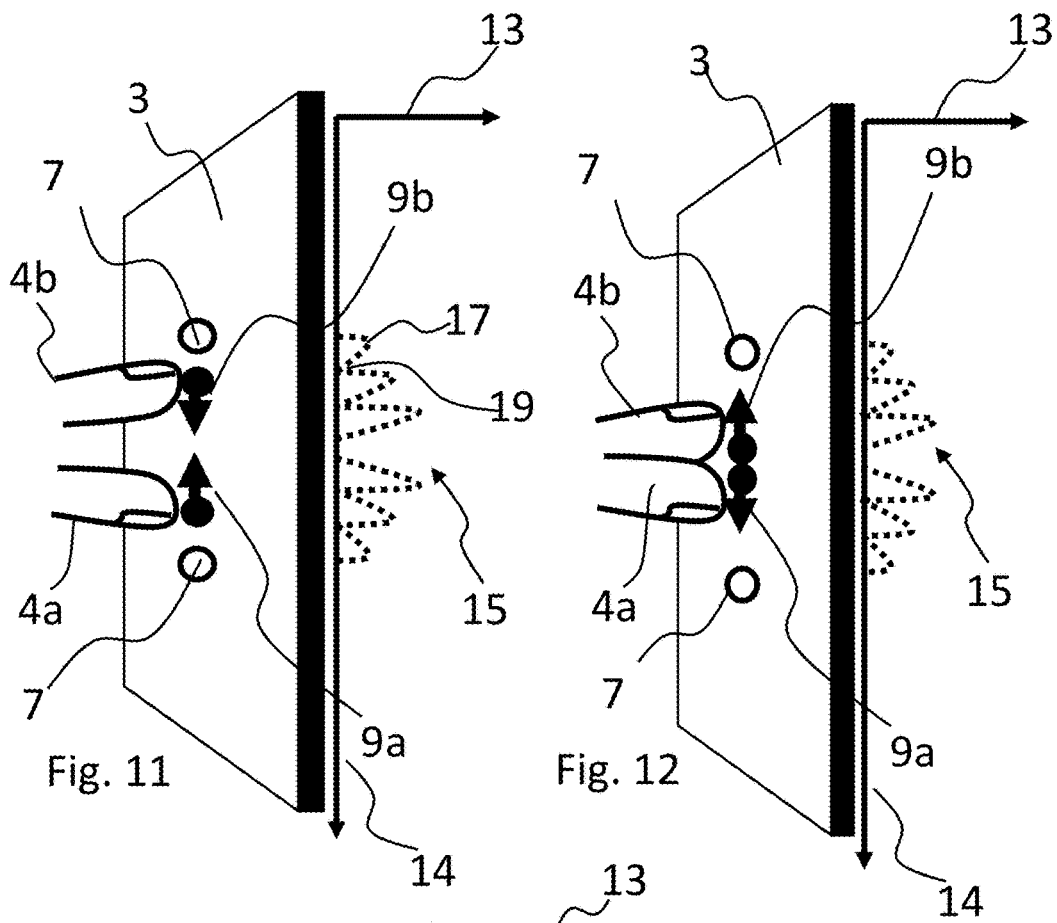
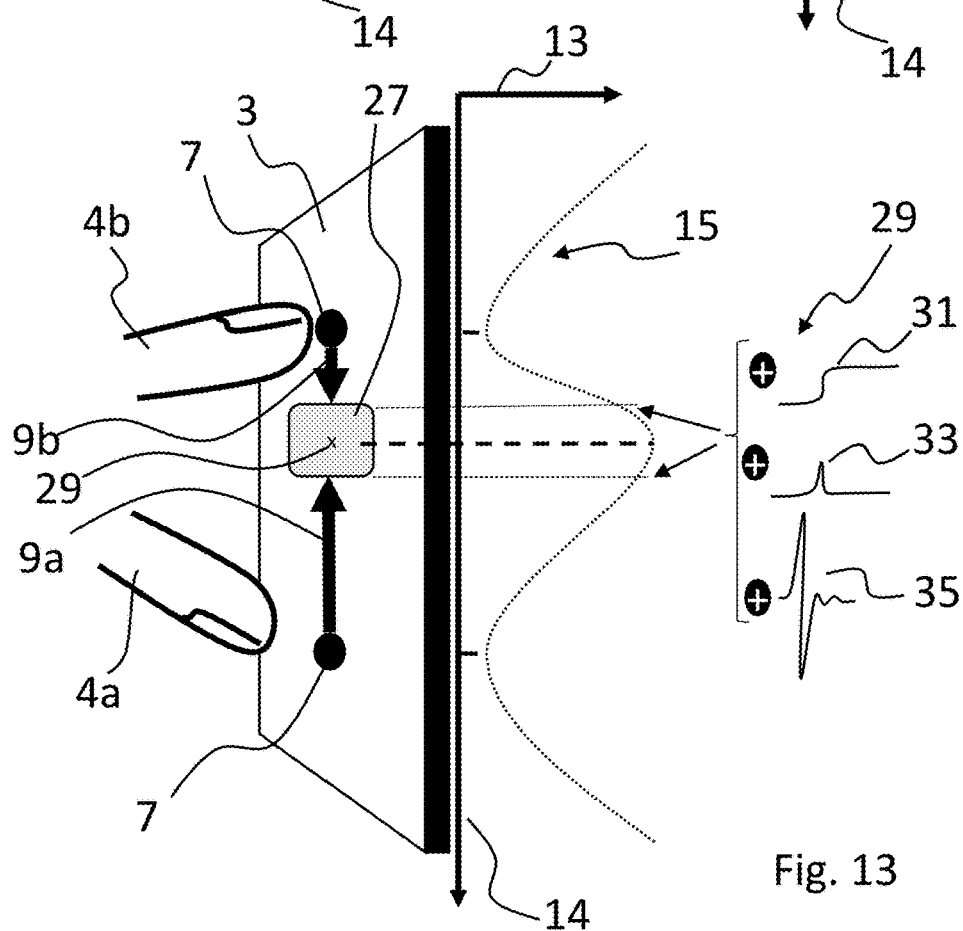

METHOD FOR GENERATING HAPTIC FEEDBACK

BACKGROUND AND SUMMARY OF THE INVENTION

Exemplary embodiments of the invention relate to a method for generating a haptic feedback on a display area operable by finger movements, as well as to a device with a display and user interface for carrying out a method.

Realizing a haptic feedback via vibrations on a display area that can be operated by finger movements, in particular a touch display, is so far known from the prior art. For example, US 2014/0327839 A1 describes a corresponding contact surface with actuators for generating vibrations. The actuators are designed here in the form of a piezoelectric layer.

US 2019/0345185 A1 also describes a touch-operated display area in which actuators, in this case piezo actuators, which are distributed around the sides of the display area, cause the surface to vibrate in the ultrasound range. The friction force opposing a finger movement can be modulated by changing the frequency. The coefficient of friction between the finger and the surface can therefore be adjusted depending on the sensed position of the finger on the user interface.

Exemplary embodiments of the present invention use such adjustability of friction between the finger and the display area to optimize haptic feedback when manipulating displayed objects.

The method according to the invention for generating a haptic feedback on a display area which can be operated by finger movements provides for modulating a coefficient of friction between the finger and the display area, comparable to the method described in the prior art mentioned at the outset, for example by generating surface vibrations of the display area via at least one actuator. According to the invention, the touchdown positions of two fingers are determined and the friction between each of the fingers and the display area is changed depending on a change in the distance of the fingers simultaneously touching the surface from the touchdown position. It is provided here that the display area of the increase or decrease in friction determining the change, hereinafter referred to as the friction display area, between one finger and the surface and another finger and the surface may be the same but also different. The touchdown position is understood to be the position that is touched by the fingers on the display area prior to a gesture, for example a zoom, grasp or swipe gesture, and the fingers then perform the corresponding gesture without moving away from the display area.

In an embodiment of the invention, the friction change is effected by means of a change in electrostatic charge and/or surface vibrations applied to the display area by at least one actuator. In particular, a combination of both systems advantageously allows friction modulation over a wide range.

In an advantageous embodiment, the friction increases at least in portions as the distance of the fingers from the touchdown positions changes. This provides an initial haptic feedback because the changing friction can now be used to draw conclusions purely haptically about the change or the current object size even without the optical feedback of the object manipulation. The friction between the fingers and the display area preferably assumes the smallest value in the overall course when the fingers are in the touchdown position. With a change in the distance to the touchdown position, i.e., with an increase or decrease in distance relative to the touchdown position, the friction increases according to a predetermined friction gradient. The fact that the touchdown positions represent a friction sink, so to speak, provides the user with a simple orientation for finding the touchdown position of the fingers.

In an alternative embodiment, the friction decreases with the change in distance of the fingers from the touchdown positions, so that the finger assumes the greatest value in the overall course when in the touchdown position. The touchdown position of the fingers is thus haptically retrievable, as this represents the area of highest friction, i.e., the peak of the friction mountain.

In an advantageous embodiment of the method, the frictional resistance between the fingers and the display area is already set to a starting friction value when the approach of the fingers to the operable display area is detected by a change of the amplitude and/or frequency of the surface vibration or an electrostatic charge. The display area is thus advantageously already prepared by presetting friction-determining parameters so that the desired frictional resistance is immediately available between the finger and the display area without delay when the display area is touched by the fingers.

In a preferred embodiment, when a predetermined change in distance of each of the fingers from the touchdown position is reached, the friction gradient is set to a friction gradient opposite the one that was effective until the change in distance, i.e., is set to a gradient with an opposite slope. Accordingly, a positive friction gradient has a positive slope, a negative friction gradient has a negative slope. When the predetermined change in distance is reached, the friction gradient becomes negative if the friction gradient is positive up to the predetermined change in distance, or becomes positive if the friction gradient is negative up to the predetermined change in distance. The user receives a significant feedback when sweeping over the predetermined distance change, which is perceived, for example, like a step or detent of a zoom operation. Similar to a mechanical switch, where the force first increases when the switch is actuated and then falls back to a detent position, such detent positions are simulated with a rising and falling friction gradient.

In a preferred development, the friction curve is repeated from the point at which a predetermined further second distance change is exceeded until the second distance change. Preferably, the first distance change is equal to the second distance change, so that multiple repetitions lead, for example, to a uniform, for example wave-shaped or sawtooth-shaped friction curve, which advantageously conveys successive steps or detents of the zooming operation to the user.

In an embodiment of the method, the slope of the rising and/or falling friction gradients is increased or decreased with each repetition, i.e., the gradients become steeper or flatter. Additionally, or alternatively, the maximum value of the repeated portion of the friction curve is changed. In addition to repeating detents through the friction curve, increasing the friction gradients and/or the maximum value raises the overall friction level, providing the user with a haptic measure of the current zoom level in addition to the detents. Similarly, by reducing, i.e., flattening, the gradients and/or by reducing the maximum value in the case of repetitive detents, the overall friction level can be lowered, whereby a distance from a relevant zoom range, for example, is haptically indicated to the user.

In an advantageous embodiment, changes in the distance of the fingers touching the surface at the same time with respect to the touchdown positions are caused by a rotation of the fingers about a pivot point on the display area. By means of the arrangement, for example, a haptic feedback can be generated when operating a rotary control displayed on the display device or when rotating a navigation map. As the fingers are moved away from the touchdown positions by rotation about a pivot point on the display device, the frictional resistance increases so that a zero position described by a friction sink or a friction maximum can be perceived haptically in the touchdown positions.

In an alternative embodiment, the mutual change in distance between the fingers causes objects to be zoomed. An object is zoomed in or out on the display area according to the change in distance with respect to the touchdown positions. Starting from the touchdown position, the friction between the finger and the display area preferably increases; depending on the application, it can also decrease. The user feels a change in friction during the zooming operation, which gives them haptic feedback about the effectiveness of their actuation even without eye contact.

According to an additional or alternative development of the method according to the invention, changes in the distance of the fingers touching the surface at the same time with respect to the touchdown positions are effected by a diametrically opposed movement for grasping an object, wherein the friction gradient between the display area and the finger touched down closer to a reference point of the object, for example a centroid or a geometric center, is set greater than the friction gradient between the display area and the other finger. An object displayed on the display area is grasped as two fingers move towards the object. As soon as the object is positioned adjacent to the two fingers, this object is considered to be grasped and can be manipulated, i.e., moved, for example, by means of the fingers on the display area. If the distances of the touchdown positions are different with respect to the reference point of the object, the friction gradients are adjusted in such a way that the finger touched down further from the geometric center of the object approaches the object boundary more quickly and the closer finger more slowly, so that the object is touched with both fingers at the same time. With a friction gradient increasing from the touchdown position, the friction gradient between the display area and the finger further away from the reference point is thus selected to be flatter than the friction gradient between the display area and the other finger. Ideally, the object is thus centered with respect to the fingers in such a way that both fingers touch and virtually grasp the object boundary at the same time. In case of a friction gradient decreasing from the touchdown position, the friction gradient between the display area and the finger touched down closer to the reference point of the object is set smaller than the friction gradient between the display area and the other finger. In a modification, a wave-shaped or sawtooth-shaped friction curve can be superimposed on the friction curves according to the previous description.

According to an extraordinarily favorable embodiment of the method according to the invention, a signal in the form of a significant friction change or in the form of a vibration pulse generated by an actuator on the display area is applied to the user interface as soon as the object is virtually grasped with both fingers. The object is virtually grasped as soon as the boundary of the object is touched on both sides with the fingers; this state is signaled to the user by an additional haptic signal. With the haptic signal, the user receives the information that the object located between their two fingers can be manipulated. The haptic signal is generated by a significant change in friction, i.e., for example a sudden increase in friction and/or a vibration pulse of an actuator.

The device according to the invention comprises an operable display area set up for carrying out the method described above.

Further advantageous embodiments of the method according to the invention as well as of a device or an apparatus for implementing said method, which can preferably be arranged in a vehicle, can also be found in the exemplary embodiments, which are illustrated in greater detail below with reference to the figures. Described and/or illustrated features can form the subject matter of the invention on their own or in any useful combination, if necessary also independently of the claims, and can in particular additionally also be the subject matter of one or more separate application(s). Identical, similar and/or functionally like parts are provided with like reference signs.

BRIEF DESCRIPTION OF THE DRAWING FIGURES

In the drawings:

FIG. 1 shows a schematic representation of an apparatus with an operable display area for carrying out the method, and FIG. 2 to FIG. 13 show embodiments of the method according to the invention.

DETAILED DESCRIPTION

FIG. 1 shows a schematic representation of an apparatus 1 with an operable display area 3. A person, not shown here, touches the display area 3 with two fingers 4a, 4b, generally a thumb and index finger, in a touchdown position 7, in order to then manipulate an object 5 by way of a simultaneous swiping movement of the two fingers 4a, 4b, i.e., to zoom in, for example, in the direction of the arrows 9a, 9b.

The display area 3 is now provided with various actuators 11, some of which are arranged laterally around the display area 3. These actuators 11, as indicated, can be located laterally above, below, to the left and to the right of the display area 3. They can also have a strip-like design and be located to the side of the display area 3 or below the display area 3. A matrix-like arrangement or an arrangement of the actuators 11 on only one or two sides in the area of the display area 3 would also be conceivable. The actuators 11 are suitable for generating vibrations on the surface of the display area 3. They may be piezo actuators, for example, but also electrostatic and/or capacitive electrodes or actuators. In relation to the basic friction acting between fingers 4a, 4b and display area 3 without the influence of actuators 11, friction is reduced, for example by increasing the amplitude and/or frequency of the ultrasonic vibration generated by piezo actuators. In another embodiment, actuators are provided to change the electrostatic charge of the display area, the friction would then be increased by increasing electrostatic charge.

Via the actuators 11, the display area 3 is now vibrated, for example, in such a way that the coefficient of friction between the display area 3 and the operating fingers 4a, 4b can be changed. The friction between the fingers and the display area 3 is thus varied appropriately depending on the position of the fingers 4a and 4b.

Figure 2:
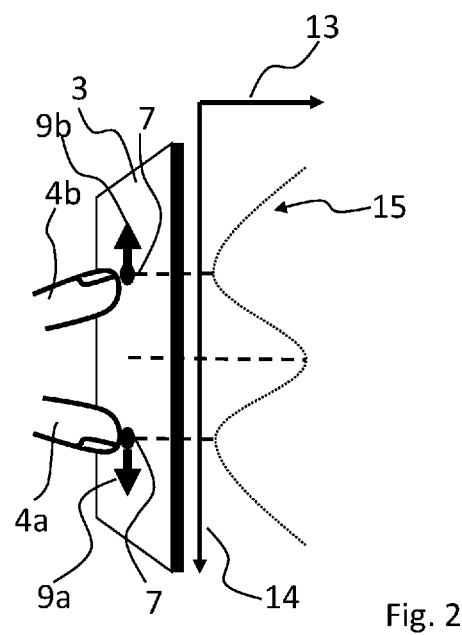

FIG. 2 shows a first variant in which the fingers 4a and 4b are shown in a touchdown position 7. The ordinate 13 of the axis cross shows the amount of friction, the abscissa 14 shows the path covered by the fingers 4a, 4b in the direction of the arrows 9a, 9b on the display area 3.

The path friction curve is shown by the graph 15. The friction between the display area 3 and the fingers 4a, 4b is set to a minimum in the touchdown positions 7; starting from the touchdown positions 7, the friction increases with a positive gradient in the directions of movement shown by the arrows 9a, 9b. A friction maximum is reached as soon as the fingers 9a, 9b touch each other, i.e., are not at a distance from each other, or are at a maximum possible distance from each other on the display area 3. The user thus receives haptic feedback about the degree of zoom when zooming in or out on an object, and can also easily find the touchdown positions 7, i.e., the initial position, through the haptic feedback caused by the friction curve 15.

Figures 3, 4:
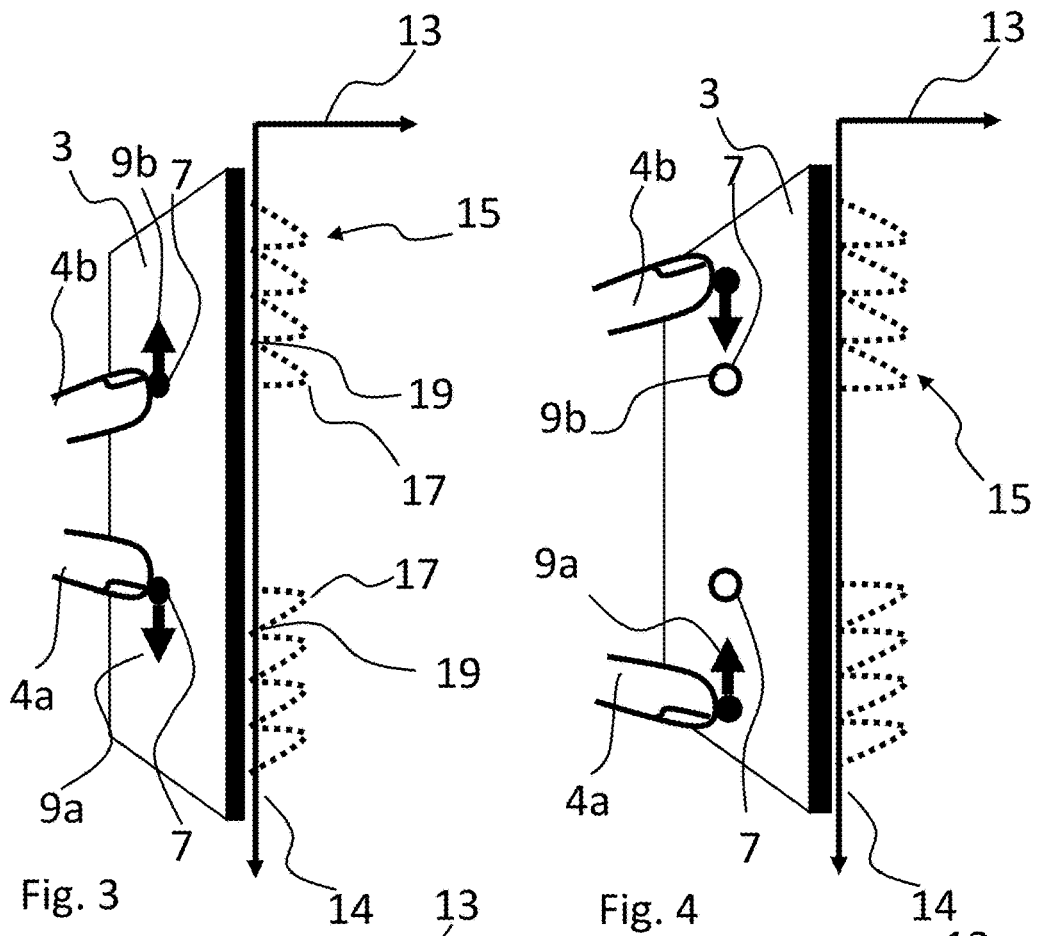

FIG. 3 shows a variant in which, starting from the touchdown positions 7, following a rise in friction, the friction decreases again after a predetermined change in distance 17, i.e., the friction gradient is positive up to the change in distance 17 and negative thereafter. The gradients are selected here so that the positive gradient is steeper than the negative gradient in the direction of movement. From a further predetermined distance 19, the previous friction curve 15 is repeated or repeated several times. Thus, a sawtooth-like friction curve 15 is realized, which provides the user with a haptic feedback of repetitive detents, for example when stretching out a window or zooming in on an object such as a map. In a variation, the positive and negative gradients can have an equal amount of slope.

In FIG. 4, in contrast to FIG. 3, the state of a window that has already been zoomed in on with the fingers 4a, 4b with respect to the touchdown positions, for example, is shown. The fingers 4a, 4b move in the opposite direction of the arrows 9a, 9b compared to FIG. 3. Because the gradient of the friction increase is smaller in this direction of movement than the friction decrease, the frictional resistance in the direction of the touchdown positions 7 is smaller than when zooming in according to FIG. 3. The different gradients make it easier to find the position of the starting points 7.

Figures 5, 6:
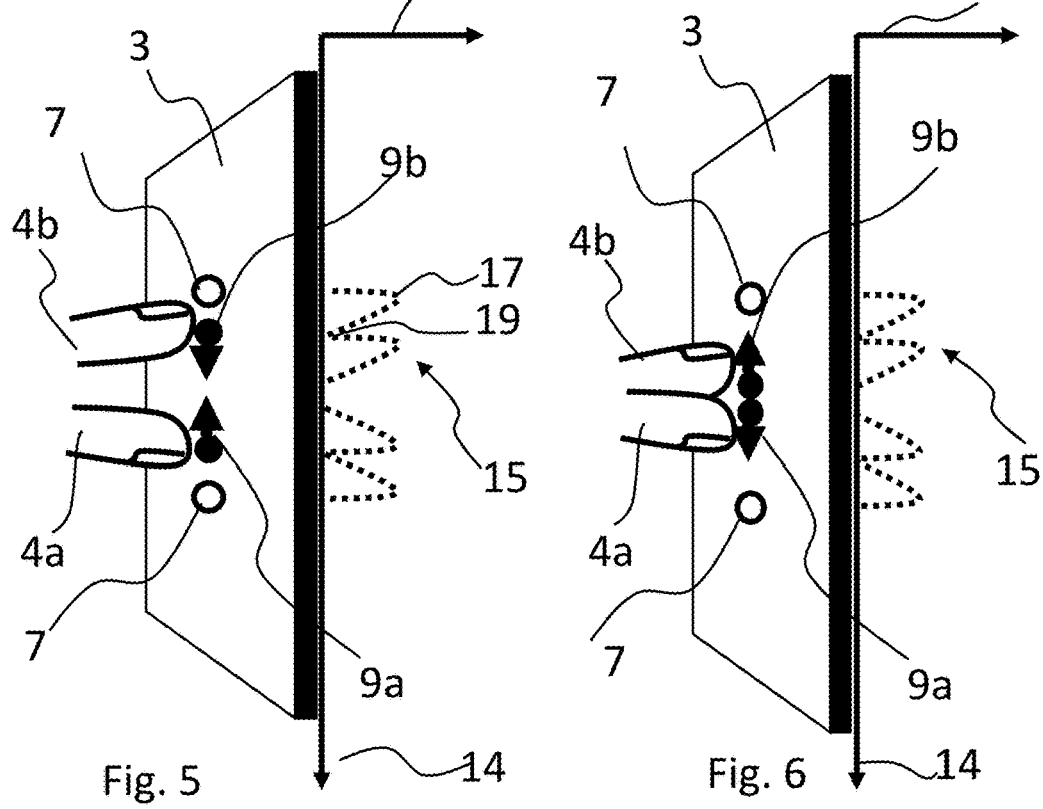

FIG. 5 shows the state of a window zoomed in on, for example, in relation to the touchdown positions with the fingers 4a, 4b. The fingers 4a, 4b moved in the direction of the arrows 9a, 9b move away from the touchdown positions 7. The friction curve 15 is again such that following a touchdown the friction increases with a first gradient and decreases again with a gradient that is flatter than the first. Analogously to FIG. 3, the increase and decrease in friction is repeated cyclically so that detents are perceptible by the finger of a user.

Compared to FIG. 5, in FIG. 6 the fingers 4a, 4b are moved in the opposite direction of movement 9a, 9b on the display area 3, i.e., a window is zoomed in on again after a small zoom, for example. Since the rising friction gradient in the direction of movement 9a, 9b is now flatter than the falling friction gradient, the fingers can easily be moved in the direction of the touchdown positions 7. When the fingers 4a, 4b continue to move into the touchdown positions 7, the friction curve 15 changes as shown in FIG. 3, so that the rising friction gradient is steeper than the falling friction gradient in the direction of movement. The change in slope in the touchdown positions 7 is haptically marked and can be easily found by the user.

Figure 7:
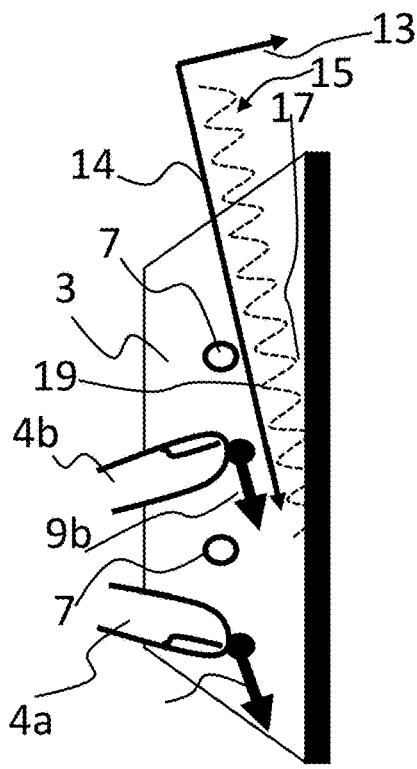

FIG. 7 shows a movement of the fingers 4a, 4b on the display area 3, wherein the distances between the fingers do not change. Such a movement can be used, for example, to move or scroll an object or a section of the screen. Starting from the touchdown positions 7, the fingers 4a, 4b are moved in parallel in the direction of the arrows 9a, 9b. The friction curve 15 is set in such a way that positive and negative friction gradients alternate, for example analogously to FIG. 3, so that the user feels the haptic impression of successive detent steps.

Figure 8:
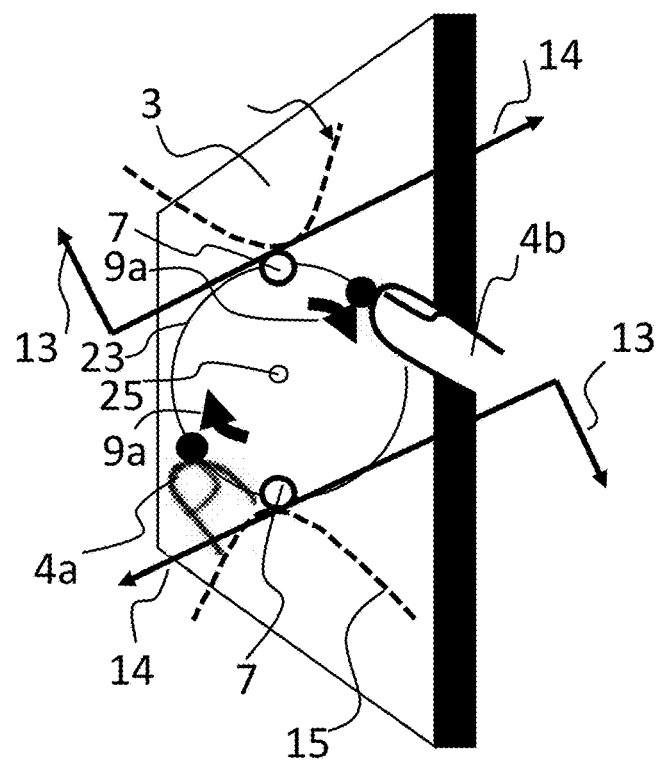

FIG. 8 shows an application comprising rotation of a symbol or virtual switch. The movement of the fingers 4a, 4b in the direction of the arrows 9a, 9b is tangential to the switching element 23, which is rotated about the center point 25. The angle of rotation is plotted on the abscissa 14, and the coefficient of friction on the ordinate 13 of the coordinate system. The friction curve 15 causes the friction to increase with the rotation of the virtual switching element 23 starting from the touchdown positions 7 and provides the user with a haptic feedback corresponding to a mechanical, spring-loaded rotary switch. In the direction of rotation opposite to the arrow directions 9a, 9b, the friction also increases starting from the touchdown positions 7, so that a zero position of the switching element 23 is defined in the friction sink.

Figure 9:
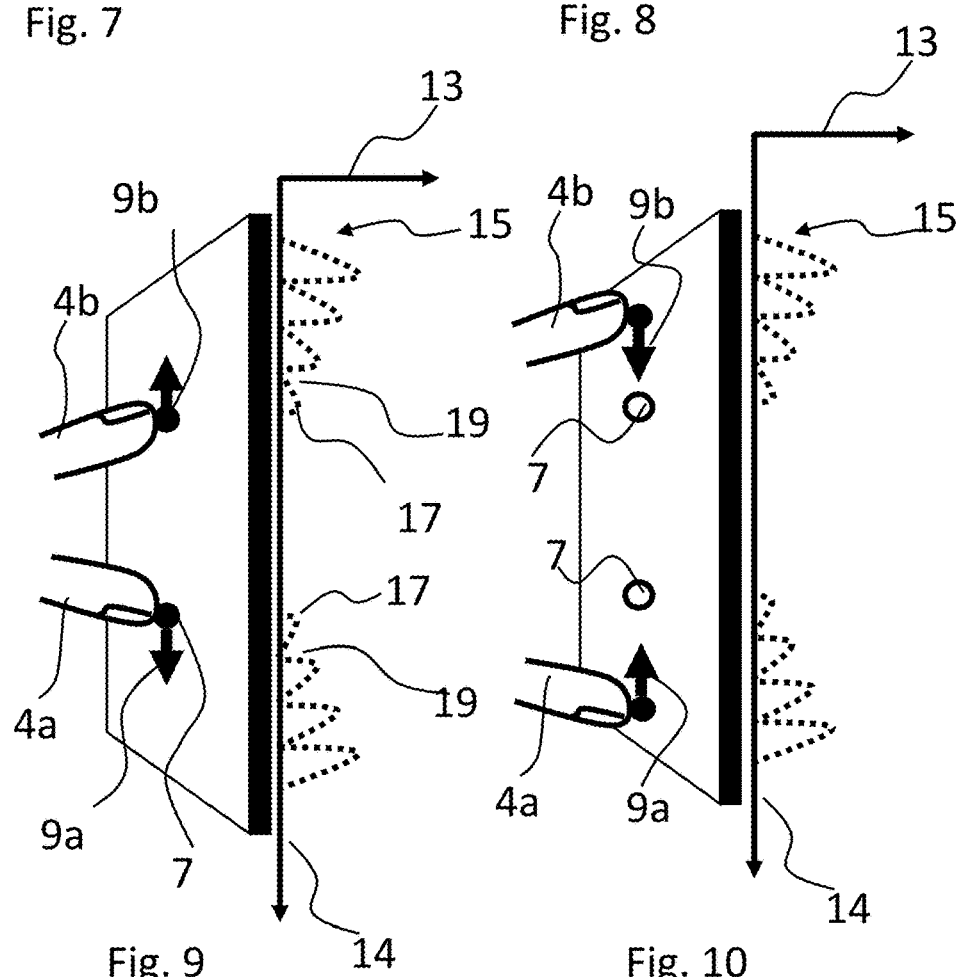
Figure 10:
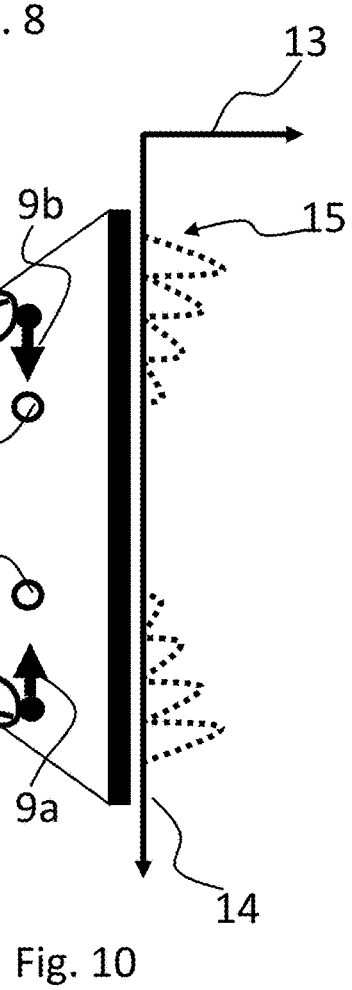

FIGS. 9 and 10 show a modification of the embodiment shown in FIGS. 3 and 4.

Compared to FIG. 3, in FIG. 9 the level of the friction maxima between fingers 4a, 4b and the display area 3 is increased with each repetition. The friction curve 15 is repeated from the predetermined distance 19 onwards, with the level of the friction maximum at the same time being increased in the subsequent portion of the friction curve 15. With further repetitions, the friction maximum is continuously increased up to a physically possible maximum value.

At the same time, as an additional supplement, the slope of the rising and falling gradient can be increased with each repetition. In order to reach the next detent stage in each case, the maximum force to be overcome at a user's finger increases.

Correspondingly to FIG. 4, FIG. 10 shows two fingers 4a, 4b moved away from the touchdown positions 7 and moving again in the direction of the arrows 9a, 9b towards the touchdown positions 7. The friction maxima are reduced again with each repetition of a portion of the friction curve 15 to make it easier to find the touchdown positions.

FIGS. 11 and 12 show a modification of the embodiment shown in FIGS. 5 and 6.

FIG. 11 shows the state of a window that, for example, has been zoomed in on by the fingers 4a, 4b relative to the touchdown positions 7. The fingers 4a, 4b moved in the direction of the arrows 9a, 9b are moving further away from the touchdown positions 7. The friction curve 15 is again formed in such a way that the friction increases with a first gradient following a touchdown and decreases again with a gradient that is flatter than the first gradient. Analogously to FIG. 3, the friction increase and decrease is repeated cyclically, with the maximum friction value being increased with each repetition. As an additional supplement, the slope of the rising and/or falling gradient can be increased with each repetition.

FIG. 12 shows, in comparison to FIG. 11 analogously to FIG. 6, a backward movement of the fingers 4a, 4b in the direction of the touchdown positions 7. Similarly, portions of the friction curve 15 comprising rising and falling gradients are repeated, with the maximum friction values of these portions being continuously reduced. As a supplementary measure, the portions of the friction curve 15 comprising rising and falling gradients are flattened as the touchdown position 7 is approached.

FIG. 13 shows another application of a virtual grasping or selection of an object 27 on the display area 3 by means of the fingers 4a, 4b. The fingers 4a, 4b are placed at the touchdown position 7 and then moved in the direction of the arrows 9a, 9b towards the object 27 on the display area 3. The finger 4a is further away here from the center of gravity 29 of the object 27 than the finger 4b. Starting from the touchdown position 7, the friction increases with predetermined gradients in the direction of the arrows 9a, 9b and, according to FIG. 1, also in the opposite direction. The gradients of the friction curves 15 between the fingers 4a, 4b and the display area 3 are formed in such a way that the finger 4b moves more slowly and the finger 4a moves more quickly towards the center of gravity 29. For this purpose, the friction gradient, i.e., the increase in friction between the finger 4a and the display area 3, is smaller than the increase in friction between the finger 4b and the display area 3, correspondingly to the distance from the center of gravity 29. In other words, the distance between the fingers 4a, 4b and the center of gravity 29 determines the friction gradient. This automatically centers the object 27 with respect to the fingers 4a, 4b so that the fingers touch the boundary of the object 27 largely simultaneously. This object contact is signaled to the user by superimposing a signal 29 in the form of a significant friction change or in the form of a vibration generated by means of an actuator. The superimposed signal 29 can, for example, take the form of a step jump 31, an impulse 33, or a damped vibration 35.

Although the invention has been further illustrated and explained in detail by preferred exemplary embodiments, the invention is not limited by the disclosed examples, and other variations may be derived therefrom by those skilled in the art without departing from the scope of protection of the invention. It is therefore clear that a multitude of possible variations exist. It is also clear that embodiments stated as being exemplary are really only examples which are not to be understood in any way as limiting, for example, the scope of protection, the possible applications or the configuration of the invention. Rather, the foregoing description and the description of the figures allow a person skilled in the art to implement the exemplary embodiments in a concrete manner, with the person skilled in the art, aware of the disclosed concept of the invention, being able to make a variety of changes, for example with regard to the function or the arrangement of individual elements mentioned in an exemplary embodiment, without departing from the scope of protection defined by the claims and their legal equivalents, such as further explanations in the description.

The invention claimed is:

1. A method for generating a haptic feedback on a display area operable by finger movement, the method comprising:
    determining touchdown positions of two fingers simultaneously touching the display area;
    sensing changes in a position of each of the two fingers on the display area; and
    changing a friction between each of the two fingers and the display area depending on a change in distance of each of the two fingers from the respective determined touchdown position,
    wherein changes in the distance of the fingers simultaneously touching the surface with respect to the touchdown positions are effected by a diametrically opposed movement for gripping an object, wherein, when a friction gradient increases from the respective touchdown position, the friction gradient between the display area and one of the two fingers touched down closer to a reference point of the object is set to be greater than a friction gradient between the display area and the other of the two fingers, so that the one of the two fingers closer to the reference point approaches the object more slowly than the other of the two fingers.

2. The method of claim 1, further comprising:
    detecting the two fingers approaching the display area, wherein parameters determining the friction between each of the two fingers and the display area are preset to a starting value responsive to the detection of the two fingers approaching the display area.

3. The method of claim 1, wherein changes in the distance of the two fingers simultaneously touching the surface with respect to the respective touchdown positions are effected by rotation about a pivot point.

4. The method of claim 1, wherein changes in the distance of the two fingers simultaneously touching the surface with respect to the respective touchdown positions are caused by a diametrically opposed movement for zooming objects.

5. The method of claim 1, wherein a signal in the form of a friction change or in the form of a vibration generated by an actuator is applied to the display area as soon as the object is virtually grasped with both of the two fingers.

6. A device for a vehicle, the device comprising:
    a display; and
    user interface configured to
    determine touchdown positions of two fingers simultaneously touching the display area;
    sense changes in a position of each of the two fingers on the display area; and
    change a friction between each of the two fingers and the display area depending on a change in distance of each of the two fingers from the respective determined touchdown position,
    wherein changes in the distance of the fingers simultaneously touching the surface with respect to the touchdown positions are effected by a diametrically opposed movement for gripping an object, wherein, when a friction gradient increases from the respective touchdown position, the friction gradient between the display area and one of the two fingers touched down closer to a reference point of the object is set to be greater than a friction gradient between the display area and the other of the two fingers, so that the one of the two fingers closer to the reference point approaches the object more slowly than the other of the two fingers.

7. A method for generating a haptic feedback on a display area operable by finger movement, the method comprising:
    determining touchdown positions of two fingers simultaneously touching the display area;
    sensing changes in a position of each of the two fingers on the display area; and
    changing a friction between each of the two fingers and the display area depending on a change in distance of each of the two fingers from the respective determined touchdown position,
    wherein when a predetermined change in distance of each of the two fingers from the respective touchdown positions is reached, a friction gradient of the friction between the two fingers and the display area is set to a slope opposite a slope that was effective until the predetermined change in the distance.

8. The method of claim 7, wherein after a predetermined further second change in distance is exceeded, a friction curve of friction between the two fingers and the display area is repeated until the second change in distance.

9. The method of claim 8, wherein with each repetition of the friction curve the slope of the rising or falling friction gradients is changed or with each repetition a maximum value of a repeated portion of the friction curve is changed.

* * * * *